(12) United States Patent
Yang et al.

(10) Patent No.: US 12,314,083 B2
(45) Date of Patent: May 27, 2025

(54) DISPLAY DEVICE

(71) Applicant: SHARP KABUSHIKI KAISHA, Sakai (JP)

(72) Inventors: Yixin Yang, Sakai (JP); Naoki Uetake, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 234 days.

(21) Appl. No.: 17/923,890

(22) PCT Filed: May 8, 2020

(86) PCT No.: PCT/JP2020/018684
§ 371 (c)(1),
(2) Date: Nov. 7, 2022

(87) PCT Pub. No.: WO2021/224991
PCT Pub. Date: Nov. 11, 2021

(65) Prior Publication Data
US 2023/0179694 A1 Jun. 8, 2023

(51) Int. Cl.
*G06F 1/16* (2006.01)
*H04M 1/02* (2006.01)
*H04B 1/3888* (2015.01)

(52) U.S. Cl.
CPC .......... *G06F 1/1652* (2013.01); *G06F 1/1686* (2013.01); *H04M 1/0214* (2013.01); *H04M 1/0268* (2013.01); *G06F 1/1616* (2013.01); *H04B 1/3888* (2013.01); *H04M 1/0264* (2013.01)

(58) Field of Classification Search
CPC .... G06F 1/1652; G06F 1/1686; G06F 1/1616; G06F 1/1618; G06F 1/1605; H04M 1/0268; H04M 1/0264; H04M 1/0214; H04M 2250/52
See application file for complete search history.

(56) References Cited

U.S. PATENT DOCUMENTS

| | | | |
|---|---|---|---|
| 8,379,377 B2 * | 2/2013 | Walters | G06F 1/1641 361/679.04 |
| 10,542,128 B2 * | 1/2020 | Kang | H04M 1/02 |
| 11,112,826 B2 * | 9/2021 | Ko | G06F 1/1647 |
| 11,416,036 B2 * | 8/2022 | Yin | G06F 1/1652 |
| 11,557,230 B2 * | 1/2023 | Kim | G06F 1/1637 |

(Continued)

FOREIGN PATENT DOCUMENTS

| | | |
|---|---|---|
| CN | 109618033 A | 4/2019 |
| CN | 208956089 U | 6/2019 |

(Continued)

*Primary Examiner* — Nidhi Thaker
(74) *Attorney, Agent, or Firm* — ScienBiziP, P.C.

(57) ABSTRACT

A display device includes: a display unit at least partially foldable and transformable, and including a display surface that displays an image; a body unit provided to a back face of the display unit; and a sensor having a detecting surface positioned to be covered with the display unit or the body unit. The display device is switchable between a covering state in which the detecting surface is covered and an uncovering state in which the detecting surface is uncovered. The uncovering state is switched from the covering state by folding transformation of the display unit.

2 Claims, 7 Drawing Sheets

(56) References Cited

U.S. PATENT DOCUMENTS

| | | | |
|---|---|---|---|
| 11,974,406 B2* | 4/2024 | Lee | G06F 1/1637 |
| 2018/0102072 A1* | 4/2018 | Lee | G09G 3/20 |
| 2018/0198896 A1* | 7/2018 | Kang | G06F 1/1652 |
| 2018/0204884 A1 | 7/2018 | Isa | |
| 2019/0043452 A1 | 2/2019 | Silvanto et al. | |
| 2019/0261519 A1* | 8/2019 | Park | G06F 1/1677 |
| 2019/0296089 A1 | 9/2019 | Isa | |
| 2019/0361502 A1 | 11/2019 | Bai | |
| 2020/0227008 A1 | 7/2020 | Silvanto et al. | |
| 2021/0384263 A1 | 12/2021 | Isa | |
| 2022/0223122 A1 | 7/2022 | Silvanto et al. | |

FOREIGN PATENT DOCUMENTS

| | | | |
|---|---|---|---|
| CN | 110300195 A | 10/2019 |
| CN | 210429133 U | 4/2020 |
| JP | 2018536183 A | 12/2018 |
| WO | 2017013538 A1 | 1/2017 |

* cited by examiner

DISPLAY DEVICE

TECHNICAL FIELD

The present disclosure relates to a display device.

BACKGROUND ART

Patent Document 1 discloses an electronic device including a display device formed of, for example, liquid crystal display pixels and organic light-emitting diodes.

CITATION LIST

Patent Literature

Patent Document 1 Japanese Unexamined Patent Application Publication (Translation of PCT Application) No. 2018-536183

SUMMARY OF INVENTION

Technical Problem

However, Patent Document 1 described above fails to conduct sufficient study on a display device including a display unit made of a flexible base material and capable of folding transformation.

The present disclosure is intended to provide a display device capable of appropriately executing functions, by taking advantage of folding transformation of a display unit.

Solution to Problem

A display device according to an aspect of the present disclosure includes: a display unit at least partially foldable and transformable, and including a display surface configured to display an image; a body unit provided to a back face of the display unit; and a sensor having a detecting surface positioned to be covered with the display unit or the body unit, wherein the display device is switchable between a covering state in which the detecting surface is covered and an uncovering state in which the detecting surface is uncovered, the uncovering state being switched from the covering state by folding transformation of the display unit.

DESCRIPTION OF EMBODIMENTS

Embodiments and modifications of the present disclosure will be described below, with reference to the drawings. Note that like reference signs denote identical or corresponding members throughout the drawings. Details of such members will not be repeatedly elaborated upon. Moreover, the embodiments and the modifications to be described below are mere examples of the present disclosure, and the present disclosure shall not be limited to such embodiments and modifications. Other than the embodiments and the modifications, the present disclosure can be modified in various manners depending on, for example, designing, unless otherwise departing from the technical idea of the present disclosure.

First Embodiment

Figure 1:
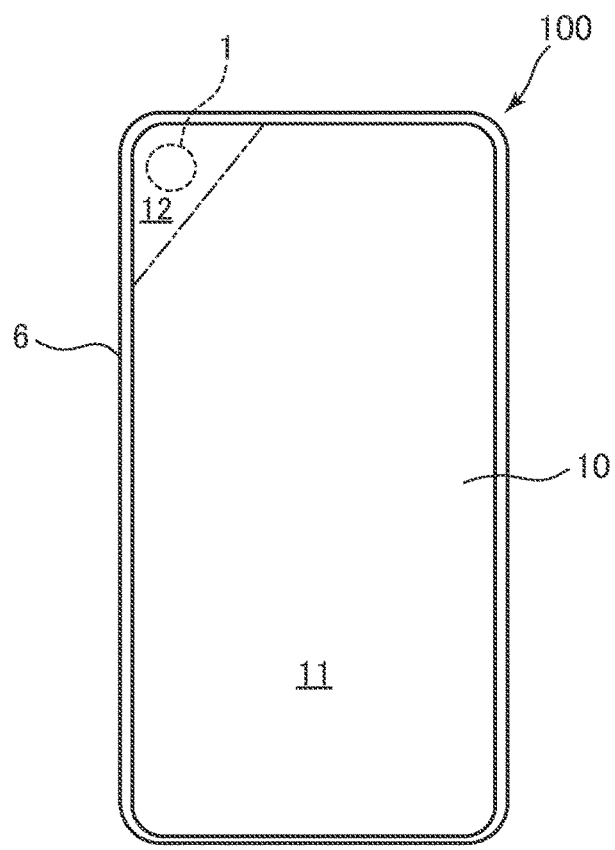
FIG. 1 is a schematic plan view of an outline of a display device according to a first embodiment.
Figure 2:
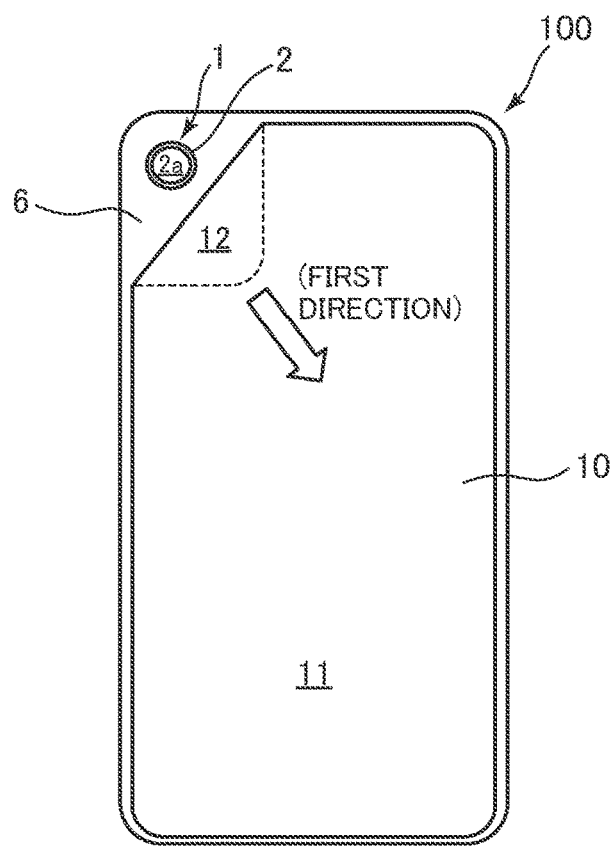
FIG. 2 is a schematic plan view of a configuration of the display device in an uncovering state according to a first embodiment.

A display device 100 according to a first embodiment will be described with reference to FIGS. 1 and 2. FIG. 1 is a schematic plan view of an outline of the display device 100 according to the first embodiment. FIG. 2 is a schematic plan view of a configuration of the display device 100 in an uncovering state according to the first embodiment.

In the first embodiment, as an example, the display device is included in a mobile terminal. However, the display device shall not be limited to such an example. For example, the display device may be included in an automatic teller machine, a vending machine, or a personal computer.

The display device 100 according to the first embodiment includes a display unit 10 including a display surface 11 that displays such an image as a still image or a moving image. Note that, in the display unit 10, the display surface 11 is a surface on which an image is displayed. As will be described later, this display surface 11 is covered with a cover unit 3 (see FIGS. 3 and 4). An example of the display unit 10 includes a display device using such a light-emitting element as an organic light-emitting diode (an OLED), a liquid crystal display device, or a quantum-dot display. The display unit 10, which is at least partially made of a flexible base material, is foldable and transformable. The display unit 10 may be provided with, as an input unit, a touch panel on which information can be entered with a finger or a stylus pen (a touch pen).

As illustrated in FIG. 1, the display device 100 is shaped into a vertical rectangle. Then, a body unit 6 is provided to the back face of the display surface 11. Moreover, as illustrated in FIG. 2, the body unit 6 includes an imaging apparatus 1 (a sensor). The imaging apparatus 1 includes: an imaging lens 2; and an imaging element (not shown) that forms an image with light received through the imaging lens 2. Note that, an imaging lens surface 2a (a detecting surface) of the imaging apparatus 1 is positioned to be covered with the display unit 10.

The display device 100 is switchable between a covering state in which the imaging lens surface 2a is covered and an uncovering state in which the imaging lens surface 2a is uncovered. The uncovering state is switched from the covering state by folding transformation of the display unit 10. As illustrated in FIG. 2, the display unit 10 includes a covering region 12 that covers the imaging lens surface 2a. Then, this covering region 12 moves along an in-surface direction of the display surface 11, such that the display device 100 can switch from the covering state to the uncovering state. Here, the in-surface direction of the display surface 11 is a direction horizontal to the display surface 11 when the display unit 10 is not in transformation.

Specifically, as illustrated in FIG. 2, the imaging apparatus 1 is provided on a corner portion (on the top-left corner portion of the drawing in FIG. 2) of the body unit 6 shaped into a rectangle. In such a case, the covering region 12 of the display unit 10 is positioned across from the imaging lens surface 2a of the imaging apparatus 1. The covering region 12 is a region on a corner portion (on the top-left corner portion of the drawing in FIG. 2) of the display unit 10 shaped into a rectangle. Then, when the display device 100 switches from the covering state to the uncovering state, the covering region 12 folds back to the back face of the display surface 11, and moves in a first direction along the in-surface direction of the display surface 11. Note that the first direction is a direction in which the covering region 12 moves away from the imaging apparatus 1. As to the display device 100 according to the first embodiment, the first direction a direction from the top-left corner toward the bottom light of the drawing in FIG. 2.

Structure to Switch to Uncovering State

Figure 3:
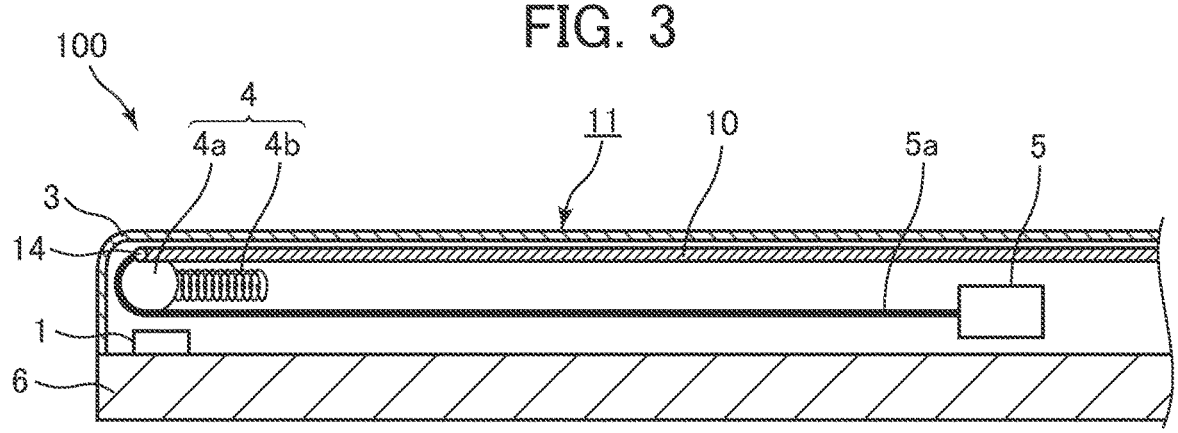
FIG. 3 is a schematic cross-sectional view of an exemplary arrangement relationship between an imaging apparatus included in a body unit and a display unit, when the display device according to the first embodiment is in a covering state.
Figure 4:
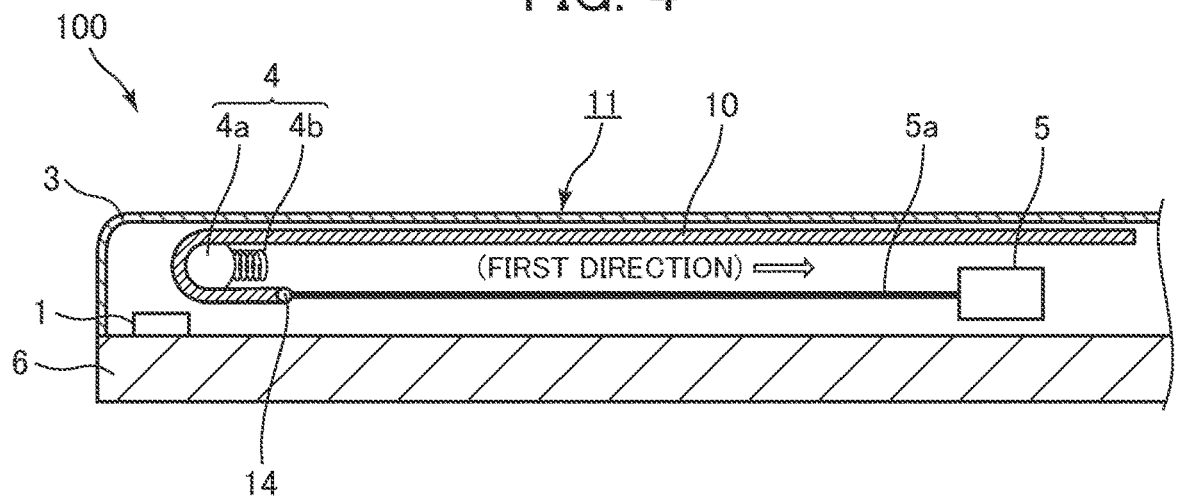
FIG. 4 is a schematic cross-sectional view of an exemplary arrangement relationship between the imaging apparatus included in the body unit and the display unit, when the display device according to the first embodiment is in the uncovering state.
Figure 5:
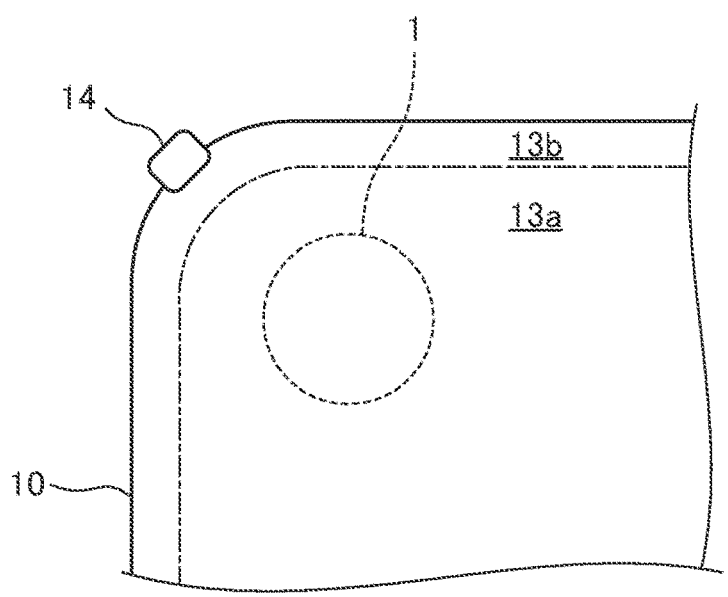
FIG. 5 is a partially enlarged view of an example of a connecting unit included in the display device according to the first embodiment.

FIGS. 3 to 5 show a structure to switch the display device 100 from the covering state to the uncovering state. FIG. 3 is a schematic cross-sectional view of an exemplary arrangement relationship between the imaging apparatus 1 included in the body unit 6 and the display unit 10, when the display device 100 according to the first embodiment is in the covering state. FIG. 4 is a schematic cross-sectional view of an exemplary arrangement relationship between the imaging apparatus 1 included in the body unit 6 and the display unit 10, when the display device 100 according to the first embodiment is in the uncovering state. FIG. 5 is a partially enlarged view of an example of a connecting unit 14 included in the display device 100 according to the first embodiment.

FIGS. 3 and 4 show that, as the structure to switch from the covering state to the uncovering state, the display device 100 includes: a guiding unit 4; and a driving unit 5.

The guiding unit 4 guides and folds the covering region 12 of the display unit 10 back to the back face of the display surface 11. The guiding unit 4 includes: a contact portion 4a; and an elastic member 4b.

The contact portion 4a is a cylindrical body or a semi-cylindrical body having a curved contact surface in contact with the covering region 12. If the display unit 11 has a thickness of 200 μm, the contact portion 4a may have a curvature radius of 1 mm to 2 mm. The contact portion 4a is cylindrical or semi-cylindrical with the curved contact surface. Such a feature makes it possible to reduce influence of stress imposed on the display unit 10 in contact with the contact portion 4a, and to fold the covering region 12 back to the back face of the display surface 11. Moreover, the contact portion 4a is connected to, and supported by, the elastic member 4b across from the curved contact surface. Hence, when the contact portion 4a is pressed in the first direction, the elastic member 4b is compressed, and the contact portion 4a moves in the first direction. Meanwhile, when the force pressing the contact portion 4a is released, the resilience of the elastic member 4b brings the contact portion 4a back to its original position. Note that an example of the elastic member 4b includes a compression spring or urethane foam.

The driving unit 5 includes a lead 5a. Through this lead 5a, the driving unit 5 is connected to the display unit 10. Hence, the driving unit 5 pulls the lead 5a in the first direction, making it possible to exert tension in the first direction in particular on the covering region 12 of the display unit 10.

Moreover, as illustrated in FIG. 5, the display unit 10 includes: a display region 13a that displays an image; and a frame region 13b; that is, a non-display region shaped into a frame and provided to an outer periphery of the display region 13a. This frame region 13b has a corner portion provided with the connecting unit 14; that is, a margin protruding outwards of the frame region 13b. In the display device 100, the covering region 12 of the display unit 10 and the lead 5a are connected together through this connecting unit 14. As can be seen, in the display device 100, the frame region 13b includes the connecting unit 14. Such a configuration makes it possible to connect the covering region 12 and the lead 5a together without compromising visibility of the display unit 10.

When the display device 100 switches from the covering state to the uncovering state, the driving unit 5 exerts tension in the first direction on the display unit 10. As illustrated in FIG. 4, by the tension exerted by the driving unit 5, the covering region 12 is brought into contact with the contact portion 4a of the guiding unit 4 and bent. Then, the covering region 12 is folded back to the back face of the display surface 11.

Moreover, the display unit 10 presses the contact portion 4a in the first direction. Because the pressing force compresses the elastic member 4b in the first direction, the display unit 10 as well as 4a moves in the first direction along the in-surface direction of the display surface 11. Hence, in the display device 100, the display unit 10 folds, transforms, and moves in the first direction along the in-surface direction. Such a feature makes it possible to uncover the imaging apparatus 1 covered with the covering region 12. Note that the switching of the display device 100 from the covering state to the uncovering state may be triggered by, for example, an instruction entered by a user to activate the imaging apparatus 1.

In contrast, when the display device 100 switches from the covering state to the uncovering state, the driving unit 5 releases the tension exerted on the display unit 10. As can be seen, when the tension is released, the elastic member 4b transforms to be restored to its original position. Hence, the covering region 12 folded back is brought back to the position in the covering state (an initial position). The switching from the uncovering state to the covering state may be triggered by, for example, an instruction entered by a user to deactivate the imaging apparatus 1. Note that if the display device 100 includes a touch panel, the instructions given by the user to activate and deactivate the imaging apparatus 1 may be executed on this touch panel.

Moreover, as illustrated in FIGS. 3 and 4, the display device 100 is provided with the cover unit 3 that covers the display unit 10. The cover unit 3 can be made of glass or plastic highly transparent to light. The cover unit 3 is joined to the body unit 6 to render the display device 100 dustproof. Note that the term dustproof means that the interior of the display device 100 is kept from dust. For example, the cover unit 3 covers the body unit 6 to keep the dust from gathering on, and entering in, such constituent features as the display unit 10, the imaging apparatus 1, the driving unit 5, and the lead 5a housed in the display device 100. Such a feature can prevent the dust from entering in the imaging apparatus 1 in the uncovering state. Moreover, the cover unit 3 may be joined in an airtight manner to the body unit 6. Hence, the cover unit 3 joined in the airtight manner to the body unit 6 blocks a flow of gas from outside, making it possible to keep the display device 100 from the influence of a change in barometric pressure and a flow of moisture. Moreover, the cover unit 3 may be joined also in a watertight manner to the body unit 6. Hence, the cover unit 3 joined in a watertight manner to the body unit 6 can block water entering from outside.

Furthermore, even when the display unit 10 transforms, the display device 100 allows the cover unit 3 to position the display unit 10 in a desired position.

Driving Unit

Figure 6:
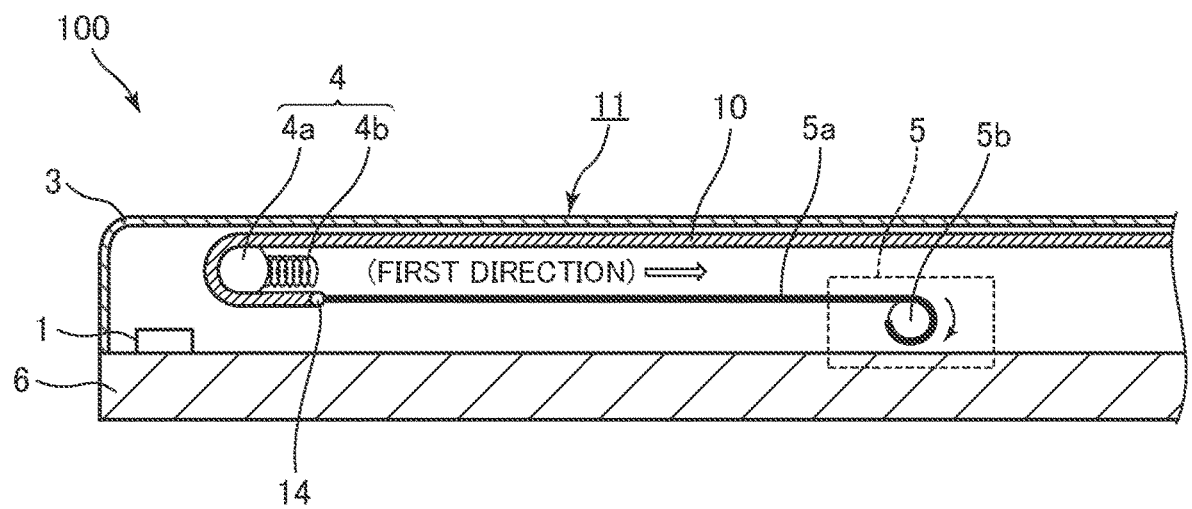
FIG. 6 is a schematic cross-sectional view of an example of a driving unit included in the display device illustrated in FIG. 3.

Next, a detailed configuration of the driving unit 5 will be described, with reference to FIG. 6. FIG. 6 is a schematic cross-sectional view of an example of the driving unit 5 included in the display device 100 illustrated in FIG. 3.

The driving unit 5 includes the above lead 5a, and further includes: a windup shaft 5b provided rotatably and winding up the lead 5a, and a rotation control unit (not shown) controlling the rotation of the windup shaft 5b. The windup shaft 5b is a cylindrical bar member extending in the in-surface direction of the display surface 11, perpendicularly to the first direction.

When the display device 100 switches from the covering state to the uncovering state, the driving unit 5 causes the rotation control unit to rotate the windup shaft 5b to windup the lead 5a. Such a feature can fold the covering region 12 back to the back face of the display surface 11, and further pull the covering region 12 in the first direction.

As can be seen, when the covering region 12 is pulled in the first direction, the contact portion 4a in contact with the display unit 10 is pressed in the first direction. When the contact portion 4a is pressed in the first direction, the elastic member 4b supporting the contact portion 4a is compressed. Hence, the covering region 12 can folded back to the back face of the display surface 11, move in the first direction along the in-surface direction of the display surface 11, and uncover the imaging lens surface 2a of the imaging apparatus 1.

Figure 7:
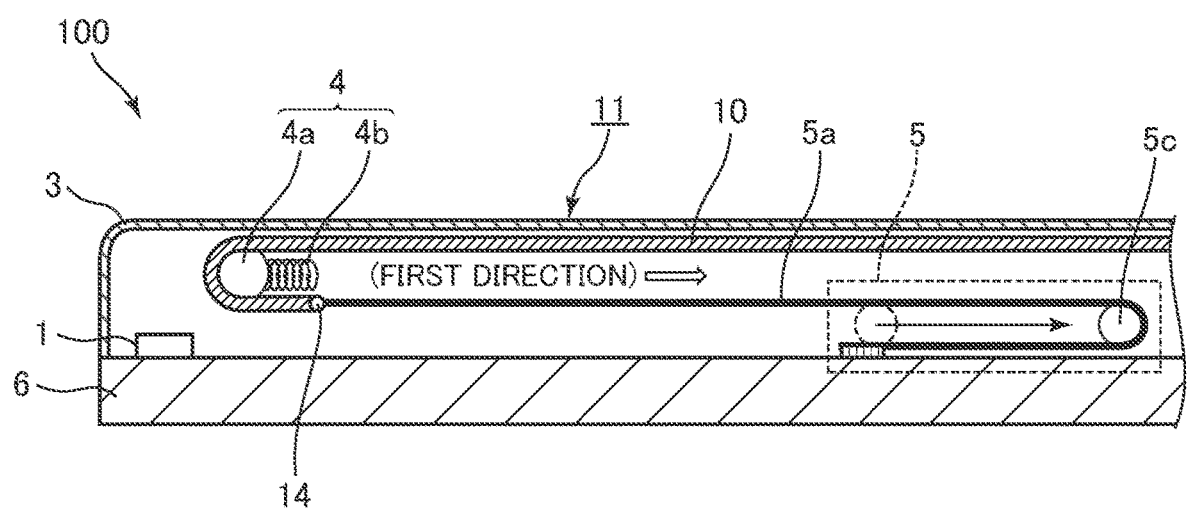
FIG. 7 is a schematic cross-sectional view of an example of the driving unit included in the display device illustrated in FIG. 3.

Note that the driving unit 5 shall not be limited to a configuration including the windup shaft 5b and the rotation control unit described above. For example, as illustrated in FIG. 7, the driving unit 5 may include a movable shaft 5c and a motion control unit (not shown) instead of the windup shaft 5b and the rotation control unit. FIG. 7 is a schematic cross-sectional view of an example of the driving unit 5 included in the display device 100 illustrated in FIG. 3.

That is, as illustrated in FIG. 7, the driving unit 5 includes: the movable shaft 5c movable in the first direction along the in-surface direction of the display surface 11; and the motion control unit causing the movable shaft 5c to move. Note that the movable shaft 5c is a bar member extending in the in-surface direction of the display surface 11, perpendicularly to the first direction.

Moreover, the lead 5a has an end portion connected to the covering region 12 of the display unit 10 and an other end portion fastened to the body unit 6. That is, the lead 5a connected to the covering region 12 extends in the in-surface direction of the display surface 11. The lead 5a then comes into contact with the surface of the movable shaft 5c and folds back to the body unit 6. Then, the other end portion of the lead 5a folded back is fastened to the body unit 6. That is, the end portion of the lead 5a is a free end, and the other end portion of the lead 5a is a fastened end. Then, the lead 5a is in contact with the surface of the movable shaft 5c in a region between the end portion and the other end portion, and folded.

When the display device 100 switches from the covering state to the uncovering state, the driving unit 5 causes the motion control unit to move the movable shaft 5c in the first direction. In accordance with the motion of the movable shaft 5c, the end portion, namely a free end, of the lead 5a is pulled in a direction in which the movable shaft 5c moves (in the first direction). Hence, the covering region 12 connected to the lead 5a is pulled in the first direction.

Alternatively, the driving unit 5 may be a rack-and-pinion driving mechanism having a combination of a gear wheel in a small diameter (a pinion) and a plate-like bar member (a rack). Thus, if the driving mechanism of the driving unit 5 is the rack-and-pinion driving mechanism, an end portion of the lead 5a is connected to the display unit 10 and an other end portion of the lead 5a is connected to an end portion of the rack. Then, by the motion of the rack in accordance with the rotation of the pinion, the covering region 12 of the display unit 10 may be pulled through the lead 5a such that the imaging lens surface 2a of the imaging apparatus 1 is uncovered. Such a configuration allows the display device 100 to quickly switch between the covering state and the uncovering state.

As can be seen, when the covering region 12 is pulled in the first direction, the contact portion 4a in contact with the display unit 10 is pressed in the first direction. When the contact portion 4a is pressed in the first direction, the elastic member 4b supporting the contact portion 4a is compressed. Hence, the covering region 12 can fold back to the back face of the display surface 11, move in the first direction along the in-surface direction of the display surface 11, and uncover the imaging lens surface 2a of the imaging apparatus 1.

When the imaging lens surface 2a is uncovered, the imaging apparatus 1 starts to obtain an image. After the image is obtained, in the display device 100, the covering region 12 folded back is brought back to its original position by the resilience of the elastic member 4b so that the display unit 10 can display the image to full screen.

As can be seen, in the display device 100, the imaging lens surface 2a (the detecting surface) of the imaging apparatus 1 is positioned to be covered with the display unit 10. That is, when the imaging apparatus 1 does not obtain an image, the imaging apparatus 1 can be hidden behind the back face of the display unit 10. Thus, the display device 100 eliminates the need to provide a notch portion to the display unit 10 in order to dispose the imaging apparatus 1, making it possible to display an image to full screen. Thanks to such a feature, the display device 100 can appropriately execute functions of the imaging apparatus 1, by taking advantage of the folding transformation of the display unit 10.

Modification 1

Figure 8:
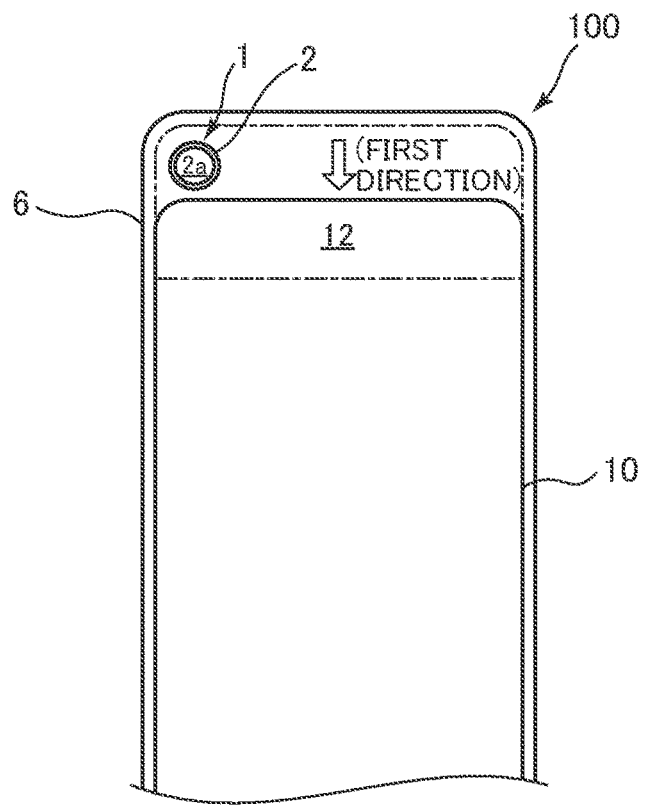
FIG. 8 is a plan view of an exemplary outline of the display device in the uncovering state according to Modification 1 in the first embodiment of the present disclosure.
Figure 9:
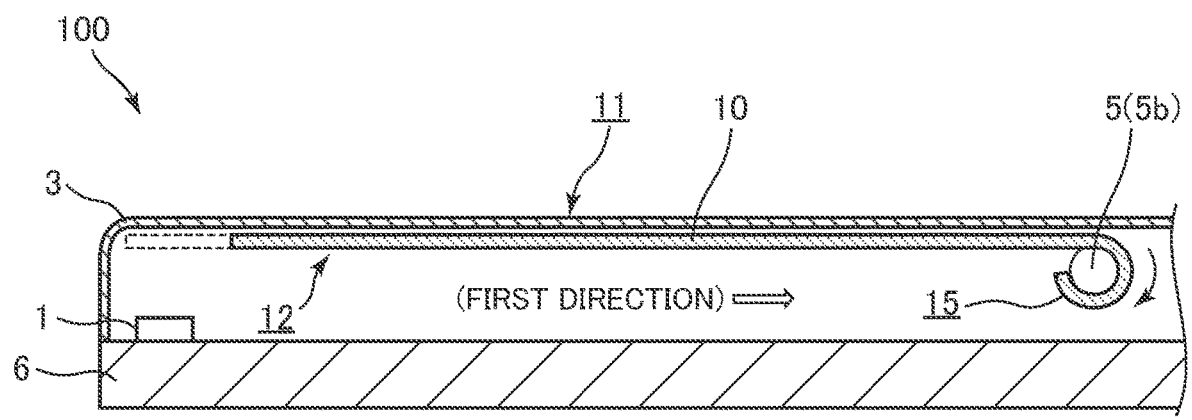
FIG. 9 is a schematic cross-sectional view of an example of the driving unit included in the display device according to Modification 1 in the first embodiment of the present disclosure.
Figure 10:
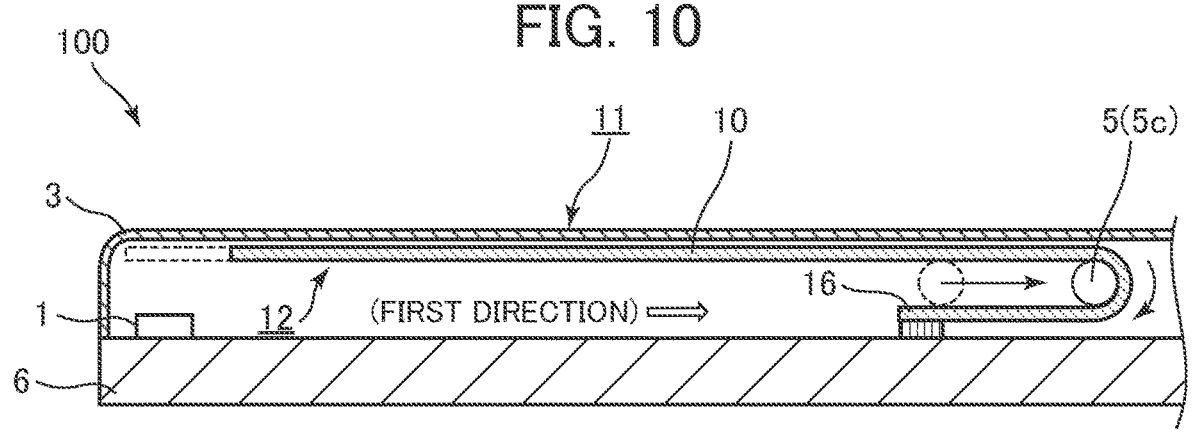
FIG. 10 is a schematic cross-sectional view of an example of the driving unit included in the display device according to Modification 1 in the first embodiment of the present disclosure.

Next, the display device 100 according to Modification 1 of the first embodiment will be described with reference to FIGS. 8 to 10. FIG. 8 is a plan view of an exemplary outline of the display device 100 in the uncovering state according to Modification 1 in the first embodiment of the present disclosure. FIGS. 9 and 10 are schematic cross-sectional views of an example of the driving unit 5 included in the display device 100 according to Modification 1 in the first embodiment of the present disclosure.

The display device 100 according to the first embodiment folds the covering region 12 of the display unit 10 back to the back face of the display surface 11, pulls the covering region 12 in the first direction, and uncovers the imaging apparatus 1. However, as illustrated in FIG. 8, the display device 100 according to Modification 1 in the first embodiment 1 is different from the display device 100 according to the first embodiment, in that the former moves the display unit 10 as a whole in a plane in which the display unit 10 of the body unit 6 is disposed, and uncovers the imaging lens surface 2a of the imaging apparatus 1.

That is, the display device 100 according to Modification 1 in the first embodiment is configured as follows: when the display device 100 switches from the covering state to the uncovering state, the display unit 10 as a whole moves, in a direction away from the imaging apparatus 1 (in the first direction), to a position in which at least the imaging lens surface 2a of the imaging apparatus 1 is uncovered. Note that, as to the display device 100 according to Modification 1 in the first embodiment, the first direction is a direction from an end portion, of the display unit 10, provided with the covering region 12 toward an other end portion, of the display unit 10, across from the end portion. When the end portion of the display unit 10 is the top and the other end portion of the display unit 10 across from the end portion is the bottom, the first direction on the drawing in FIG. 8 is a direction from the top to the bottom.

In the display device 100 according to Modification 1 in the first embodiment, as illustrated in FIG. 9, the display unit 10 includes: the covering region 12 at the end portion; and a windup region 15 at the other end portion. Then, the driving unit 5 includes: the windup shaft 5b provided rotatably and winding up the windup region 15; and a rotation control unit (not shown) controlling the rotation of the windup shaft 5b. Note that the windup shaft 5b is a cylindrical bar member extending in the in-surface direction of the display surface 11, perpendicularly to the first direction.

When the display device 100 switches from the covering state to the uncovering state, as illustrated in FIG. 9, the driving unit 5 causes the rotation control unit to rotate the windup shaft 5b to wind up the windup region 15. Thanks to such a feature, the display device 100 according to Modification 1 in the first embodiment can move the display unit 10 as a whole so that the covering region 12 is away from the imaging apparatus 1, and uncover the imaging lens face 2a.

Note that the driving unit 5 shall not be limited to a configuration including the windup shaft 5b and the rotation control unit described above. For example, as illustrated in FIG. 10, the driving unit 5 may include the movable shaft 5c and the motion control unit (not shown).

That is, the display unit 10 has: an end portion, namely a free end, to which the covering region 12 is disposed; and an other end portion (a fastened end portion 16) folded back to the back face of the display surface 11 and fastened to the body unit 6.

Moreover, the driving unit 5 includes the movable shaft 5c movable in the first direction along the in-surface direction of the display surface 11. Note that the movable shaft 5c is a bar member extending in the in-surface direction of the display surface 11, perpendicularly to the first direction. The movable shaft 5c includes a surface that comes into contact with a region between the end portion and the other end portion of the display unit 10, and that guides and folds the display unit 10 back to the back face of the display surface 11.

In such a configuration, when the display device 100 switches from the covering state to the uncovering state, the driving unit 5 causes the motion control unit to move the movable shaft 5c in a direction away from the imaging apparatus 1 (in the first direction), along the in-surface direction of the display surface 11. As can be seen, when the movable shaft 5c is moved, the covering region 12 disposed to the end portion serving as a free end can be moved in the direction away from the imaging apparatus 1 (in the first direction). Thanks to such a feature, the display device 100 according to Modification 1 in the first embodiment can uncover the imaging lens face 2a, of the imaging apparatus 1, covered with the covering region 12.

As to the display device 100 according to the first embodiment and the display device 100 according to Modification 1 in the first embodiment, the switching from the covering state to the uncovering state can be triggered by an instruction entered by a user to activate the imaging apparatus 1. Moreover, the switching from the uncovering state to the covering state is triggered by an instruction entered by the user to deactivate the imaging apparatus 1. However, the configuration of the display devices 100 shall not be limited to such a configuration.

As to the display device 100 according to the first embodiment and the display device 100 according to Modification 1 in the first embodiment, the driving unit 5 may quickly execute a sequence of processing that involves the switching from the covering state to the uncovering state, and from the uncovering state back to the covering state again. In particular, the driving unit 5 may execute the sequence of processing in synchronization with a frame rate of the imaging apparatus 1.

The above configuration allows quick execution of the sequence of processing that involves the switching from the covering state to the uncovering state, and from the uncovering state back to the covering state again. Such a feature can make it difficult for the user to visually recognize the imaging apparatus 1. Moreover, the cycle to execute the sequence of processing is synchronized with the frame rate of the imaging apparatus 1. Hence, the imaging apparatus 1 can obtain an image. Thus, the display device 100 can obtain the image while the imaging apparatus 1 is not visually recognized by the user.

Furthermore, if the sequence of processing is executed in synchronization with the frame rate of the imaging apparatus 1 as described above, the image can be obtained while the display unit 11 displays the obtained image to full screen. For example, when the user obtains an image of himself or herself on the display device 100, the image can be obtained with his or her face displayed to full screen. Such a feature makes it possible to obtain an excellent image of himself or herself.

Second Embodiment

Figure 11:
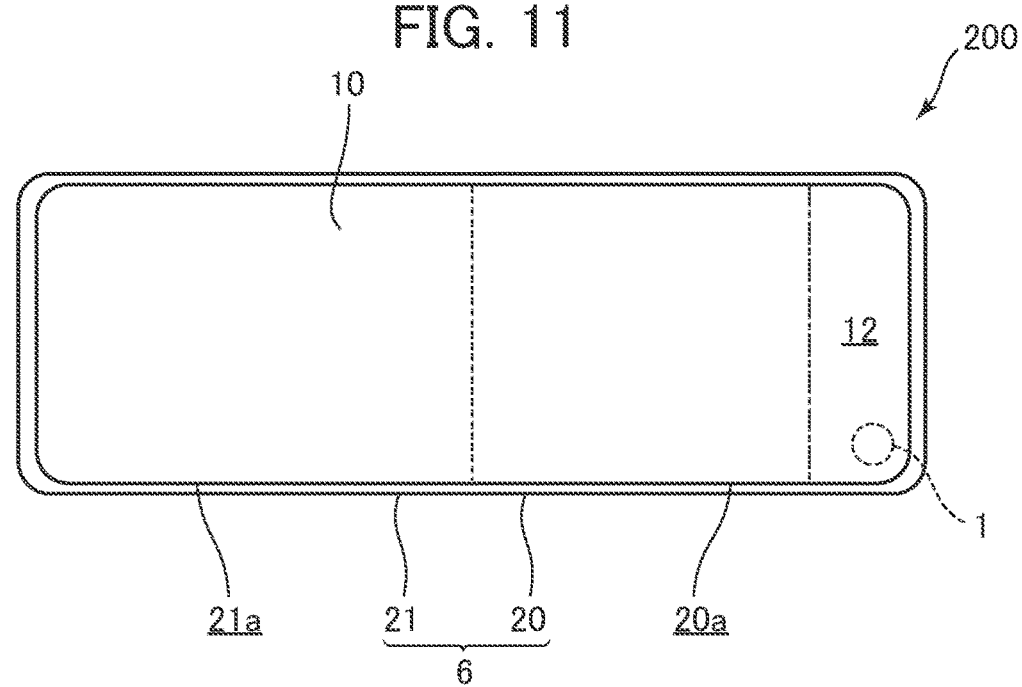
FIG. 11 is a schematic plan view of an exemplary outline of a display device in an unfolded state according to a second embodiment of the present disclosure.
Figure 12:
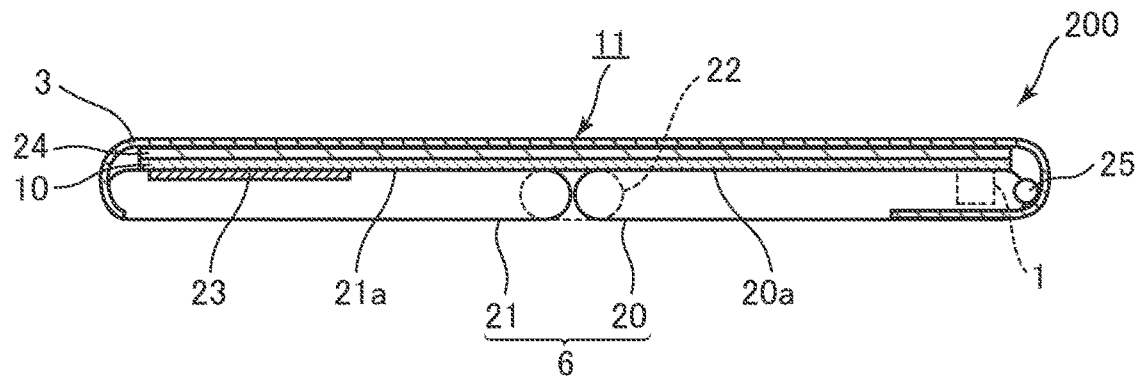
FIG. 12 is a schematic side view of the outline of the display device illustrated in FIG. 11.
Figure 13:
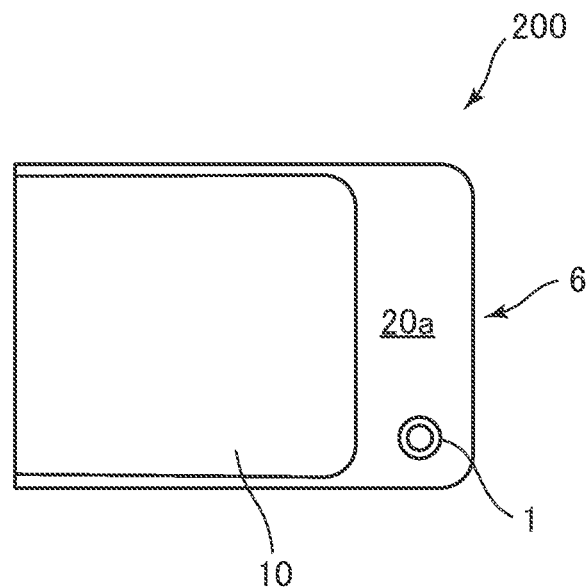
FIG. 13 is a schematic plan view of an exemplary outline of the display device in a folded state according to the second embodiment of the present disclosure.
Figure 14:
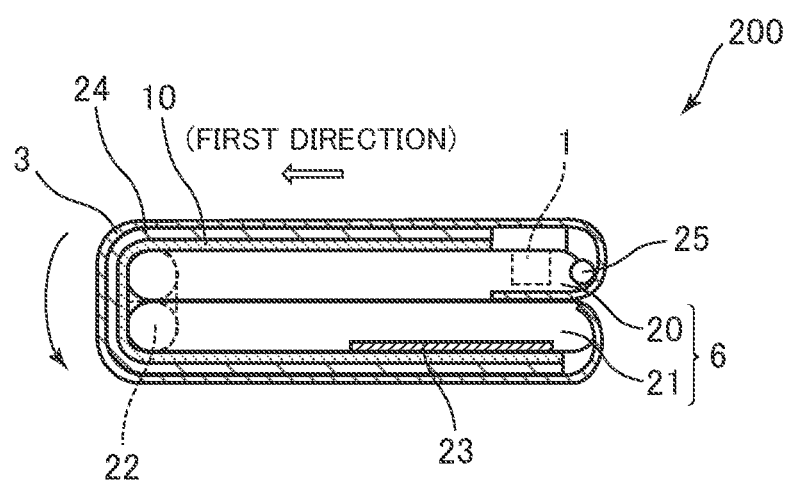
FIG. 14 is a schematic side view of the exemplary outline of the display device illustrated in FIG. 13.

Next, a display device 200 according to a second embodiment will be described with reference to FIGS. 11 to 14. FIG. 11 is a plan view of an exemplary outline of the display device 200 in an unfolded state according to the second embodiment of the present disclosure. FIG. 12 is a schematic side view of the outline of the display device 200 illustrated in FIG. 11. FIG. 13 is a schematic plan view of an exemplary outline of the display device 200 in a folded state according to the second embodiment of the present disclosure. FIG. 14 is a schematic side view of the exemplary outline of the display device 200 illustrated in FIG. 13.

The display device 100 according to the first embodiment switches from the covering state to the uncovering state when the covering region 12 is moved by the tension exerted from the driving unit 5. In contrast, the display device 200 according to the second embodiment is different in that the switching from the covering state to the uncovering state is carried out in accordance with a relative change in orientation between a first casing 20 and a second casing 21 included in the body unit 6.

That is, as illustrated in FIGS. 11 and 12, compared with the display device 100 according to the first embodiment, the display device 200 according to the second embodiment is different in that the body unit 6 includes: the first casing 20; the second casing 21; a casing joining unit 22; and a fastening unit 23. Moreover, the display device 200 according to the second embodiment is also different in that the display device 200 omits the driving unit 5 for the switching from the covering state to the uncovering state. Otherwise, the display device 200 according to the second embodiment is similar to the display device 100 according to the first embodiment. Hence, similar members between the display devices 200 and 100 are denoted with like reference signs, and such members will not be elaborated upon here.

Specifically, the first casing 20 includes a first setting face 20*a* on which the display unit 10 is set. This first setting face 20*a* is provided with the imaging apparatus 1. The second casing 21 is disposed adjacent to the first casing 20, and includes a second setting face 21*a* on which the display unit 10 is set. That is, the first setting face 20*a* and the second setting face 21*a*, which are respectively included in the first casing 20 and the second casing 21 adjacent to each other, form a setting face on which the display unit 10 is set.

The casing joining unit 22 includes a hinge mechanism rotatably joining, about an axis, respective end portions of the first casing 21 and the second casing 21 adjacent to each other. Hence, the display device 200 can be set in an unfolded state in which the first casing 20 and the second casing 21 are arranged so that the first setting face 20*a* and the second setting face 21*a* form a horizontal surface.

Moreover, as illustrated in FIGS. 13 and 14, the display device 200 can be switched from this unfolded state to the folded state in which the first casing 20 and the second casing 21 are folded with the casing joining unit 22. Note that, in this folded state, the first setting face 20*a* and the second setting face 21*a* are folded and oriented outwards. In such a folded state, an outer face of a joint portion joined by the casing joining unit 22 transforms to stretch, and an inner face thereof transforms to contract.

Moreover, in the display device 200, the second setting face 21*a* and the display unit 10 are fastened together with a fastening unit 23; whereas, the display unit 10 set on the first setting face 20*a* is movable. Thus, in the folded state, the display unit 10 set on the first setting face 20*a* and the second setting face 21*a* is pulled toward the second casing 21 by transformation of the joint portion. Such a configuration creates an uncovered region in which the display unit 10 is not set on the first setting face 20*a* of the first casing 20. In the display device 200, the imaging apparatus 1 is provided to this uncovered region. Hence, the display device 200 can uncover the imaging lens surface 2*a* of the imaging apparatus 1 when the first casing 20 and the second casing 21 are folded with the casing joining unit 22.

When the imaging lens surface 2*a* of the imaging apparatus 1 is uncovered, the imaging apparatus 1 of the display device 1 obtains an image. When the image is obtained, the display device 200 is set in the unfolded state. Thus, the covering region 12 that has been moved is brought back to its original position, and the display device 200 can display the image on the display unit 10 to full screen.

Note that, as illustrated in FIGS. 11 to 14, the display device 200 according to the second embodiment has the display unit 10 covered with the cover unit 3, as seen in the display device 100 according to the first embodiment. That is, as to the display device 200 according to the second embodiment, the cover unit 3 is attached to the body unit 6 to render the display device 200 dustproof. For example, the cover unit 3 is slidably attached to the body unit 6, and keeps the display device 200 dust-free. Then, the cover unit 3 is foldable at a position corresponding to the casing joining unit 22, as seen in the display unit 11, in order to conform to transformation in the shape of the body unit 6.

Moreover, in the folded state, the cover unit 3 is disposed outside as seen in the display unit 11. Hence, the cover unit 3 is pulled in a direction in which the cover unit 3 stretches by the transformation in the shape of the joint portion joined by the casing joining unit 22. Thus, the cover unit 3 is also movable in conformity to the transformation in the shape of the joint portion. Thanks to such a configuration, the cover unit 3 is neither displaced nor removed by influence of the transformation in the shape of the body unit 6, successfully keeping the display device 200 dust-free.

Specifically, the cover unit 3 is made of, for example, a flexible transparent film such as a transparent aramid film, or a flexible glass such as an ultra-thin chemically-strengthened glass plate. Then, the display device 100 includes the cover unit 3 as illustrated in FIG. 14, such that the cover unit 3 can move in conformity to the transformation in the shape of the joint portion. That is, as illustrated in FIG. 14, the cover unit 3 is fastened by a transparent sealing member 24 to the display surface 11 of the display unit 10. Hence, the cover unit 3 is movable together with the display unit 10. Moreover, the cover unit 3 has an end portion to the first casing 20, and the end portion is folded to the back face of the display surface 11 (folded inside in the folded state). That is, the end portion of the first casing 20 is positioned across from a joint of the first casing 20 and the second casing 21, and provided with a roller 25 shaped into a cylinder and rotatable. The roller 25 has a curved contact surface in contact with the cover unit 3. The roller 25 with the curved contact surface can guide and fold the end portion of the cover unit 3 back to the back face of the display surface 11.

Moreover, by rotational movement, the roller 25 can smoothly move the cover unit 3 folded back to the back face of the display surface 11. Hence, when the display device 200 is in the folded state, the cover unit 3 is pulled in the first direction together with the display unit 10 in accordance with the transformation in the shape of the joint portion. Here, a portion, of the cover unit 3, folded back to the back face of the display surface 11 is also pulled to move from the back face to the front face of the display surface 11. As can be seen, the cover unit 3 is movable in conformity to the transformation in the shape of the joint portion.

Third Embodiment

Figure 15:
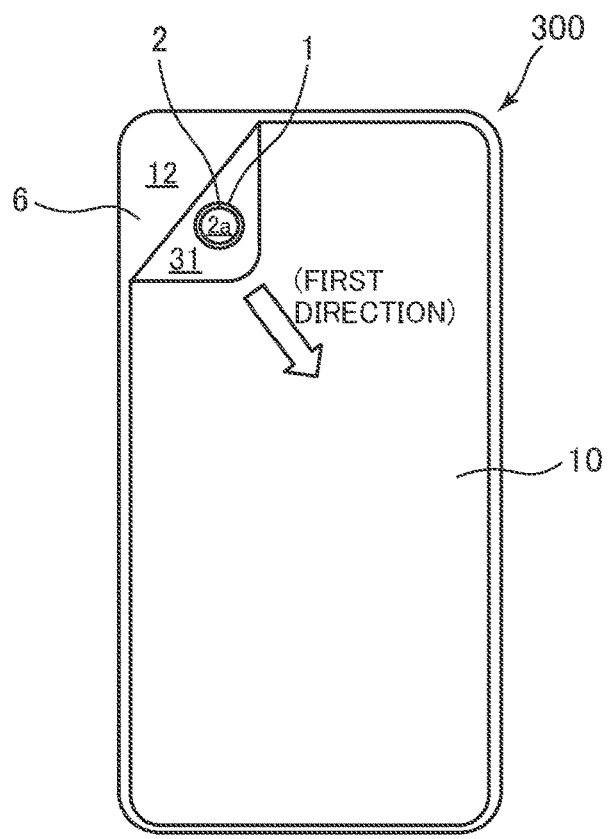
FIG. 15 is a schematic plan view of an exemplary outline of a display device in an uncovering state according to a third embodiment of the present disclosure.

With reference to FIG. 15, a display device 300 according to a third embodiment will be described. FIG. 15 is a schematic plan view of an exemplary outline of the display device 300 in an uncovering state according to the third embodiment of the present disclosure.

In the display device 100 according to the first embodiment and the display device 200 according to the second embodiment, the covering region 12 to cover the imaging lens surface 2a of the imaging apparatus 1 is included in the display unit 10. In contrast, the display device 300 according to the third embodiment is different in that the covering region 12 is included in the body unit 6. Moreover, the display unit 300 is also different in that the display unit 10 includes a supporting region 31 to support the imaging apparatus 1.

As illustrated in FIG. 15, the display unit 10 includes the supporting region 31 foldable and transformable, and supporting the imaging apparatus 1 to the back face of the display surface 11. In the display unit 10, the region other than this supporting region 31 is neither foldable nor transformable, and fastened to the body unit 6. Moreover, the cover unit 3 to cover the display unit 10 is made of flexible transparent film or flexible glass, and foldable and transformable within an area to cover the supporting region 31.

Meanwhile, the body unit 6 includes the covering region 12 that covers the imaging lens surface 2a of the imaging apparatus 1 when the display device 300 is in a covering state.

When the display device 300 switches from the covering state to the uncovering state, force is manually exerted to fold the supporting region 31 and the cover unit 3 covering the supporting region 31 back to a front face of the display surface 11. Note that the front face of the display surface 11 is a face in which the display surface 11 is formed. In other words, the front face of the display surface 11 is a face in which a user views an image displayed on the display surface 11.

As can be seen, the display device 300 according to the third embodiment allows the display unit 10 and the cover unit 3 to fold and transform so that the support region 31 is folded back to the front face of the display surface 11. Hence, the display device 300 can uncover the imaging lens surface 2a of the imaging apparatus 1. Then, the image apparatus 1 can obtain an image. When the image is obtained on the imaging apparatus 1, the support region 31 that has been folded back is brought back to its original position. After that, the display device 300 can display the image on the display unit 11 to full screen. Moreover, the display device 300 may include a window in the covering region 12 of the body unit 6, in order to obtain an image. Hence, if the covering region 12 includes the window to obtain an image, the display device 300 can obtain an image of scenery to the back face of the body unit 6 while the image is displayed on the display unit 11 to full screen.

Note that, although not illustrated in FIG. 15, the display device 300 according to the third embodiment includes the cover unit 3, as seen in the display device 100 according to the first embodiment. That is, the display device 300 includes the cover unit 3 joined to the body unit 6 to at least render the display device 300 dustproof. The cover unit 3 covers the display unit 11.

Fourth Embodiment

Figure 16:
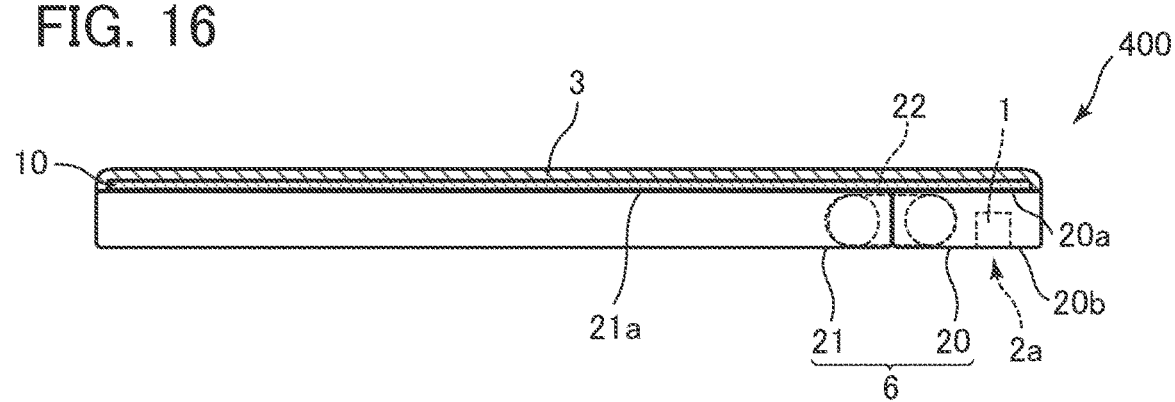
FIG. 16 is a schematic side view of an exemplary outline of a display device in an unfolded state according to a fourth embodiment of the present disclosure.
Figure 17:
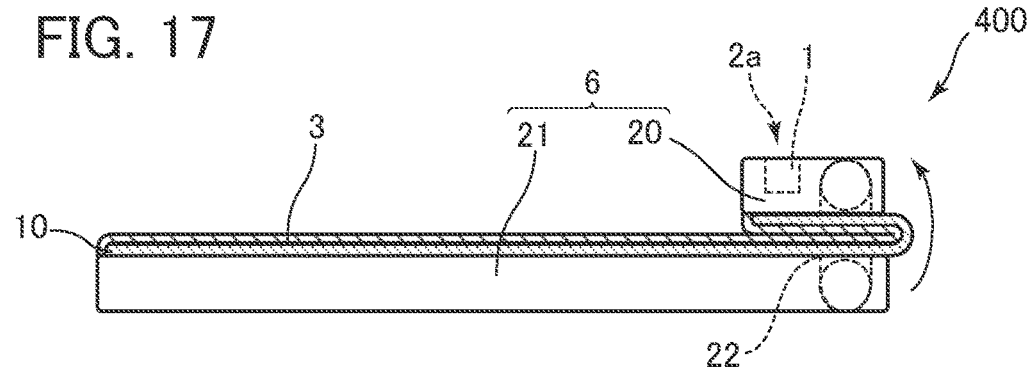
FIG. 17 is a schematic side view of an exemplary outline of the display device in a folded state according to the fourth embodiment of the present disclosure.

With reference to FIGS. 16 and 17, a display device 400 according to a fourth embodiment will be described. FIG. 16 is a schematic side view of an exemplary outline of the display device 400 in an unfolded state according to the fourth embodiment of the present disclosure. FIG. 17 is a schematic plan view of an exemplary outline of the display device 400 in a folded state according to the fourth embodiment of the present disclosure.

In each of the display devices 100, 200, and 300 according to the first, second, and third embodiments, the light lens surface 2a is positioned to be covered with either the display unit 10 or the body unit 6. Each of the display devices 100, 200, and 300 can switch from the covering state to the uncovering state by folding transformation of the display unit 10. In contrast, the display device 400 according to the fourth embodiment is different in that, when orientations of the first casing 20 and the second casing 21 are changed, the imaging lens surface 2a can be repositioned.

Specifically, FIGS. 16 and 17 show that, compared with the display device 200 according to the second embodiment, the display device 400 according to the fourth embodiment is different in that the imaging lens face 2a of the imaging apparatus 1 is not covered with the display unit 10. Moreover, in the folded state, the first casing 20 and the second casing 21 overlap with each other through different faces. Otherwise, the display device 400 according to the fourth embodiment is similar to the display device 200 according to the second embodiment. Hence, similar members between the display devices 400 and 200 are denoted with like reference signs, and such members will not be elaborated upon here.

As illustrated in FIG. 16, the display device 400 includes the body unit 6 including the first casing 20 and the second casing 21. The first casing 20 includes the first setting face 20a on which the display unit 10 is set. Moreover, the first casing 20 includes an exterior face 20b across from the first setting face 20a. To this exterior face 20b, the imaging apparatus 1 is provided. The second casing 21 includes the second setting face 21a on which the display unit 10 is set. The second casing 21 is disposed adjacent to the first casing 20.

That is, the first setting face 20a and the second setting face 21a, which are respectively included in the first casing 20 and the second casing 21 adjacent to each other, form a setting face on which the display unit 10 is set.

The casing joining unit 22 includes a hinge mechanism to rotatably join, about an axis, respective end portions of the first casing 20 and the second casing 21 adjacent to each other. Hence, the display device 400 can be set in the unfolded state in which the first casing 20 and the second casing 21 are arranged so that the first setting face 20a and the second setting face 21a form a horizontal surface. Moreover, the display device 400 can be switched from this unfolded state to the folded state in which the first casing 20 and the second casing 21 are folded with the casing joining unit 22. Note that, in this folded state, the first setting face 20a and the second setting face 21a are folded to overlap with each other.

When the display device 400 is in the unfolded state, as illustrated in FIG. 16, the imaging lens surface 2a of the imaging apparatus 1 is disposed to the exterior face 20b of the body unit 6. Hence, the display device 400 can capture an image of scenery to the exterior face 20b of the body unit 6 (to the back face of the display surface 11).

Meanwhile, when the display device 400 is in the folded state, as illustrated in FIG. 17, the imaging lens surface 2a of the imaging apparatus 1 is disposed to the front face of the display surface 11 of the display unit 10. Hence, the display device 400 can capture an image of scenery to the front face of the display surface 11.

Thus, the display device 400 can eliminate the need of individual imaging apparatuses for capturing an image of scenery to the exterior face 20b of the body unit 6 and an image of scenery to the front face of the display surface 11. The display device 400 can use an imaging apparatus for capturing both of the images. Such a feature can reduce production costs of the display device 400.

Furthermore, as illustrated in FIGS. 16 and 17, the display device 400 according to the fourth embodiment includes the cover unit 3 that is flexible, as seen in the display device 200 according to the second embodiment. Then, the cover unit 3 is joined to the body unit 6 to at least render the display device 400 dustproof. The cover unit 3 covers the display unit 10.

Note that, the above first to third embodiments describe the display devices 100 to 300 each including the imaging apparatus 1. The display devices may include a lighting apparatus, or such a sensor as a fingerprint sensor, instead of the imaging apparatus 1.

For example, if a lighting apparatus is included instead of the imaging apparatus 1, the display devices 100 to 300 cover a light-emitting face of the lighting apparatus in the covering state, and uncover the light-emitting face of the lighting apparatus in the uncovering state. As can be seen, if the light-emitting face can switch between the covering state and the uncovering state in accordance with the folding transformation of the display unit 10, the light-emitting apparatus can be turned OFF in the covering state and turned ON in the uncovering state.

Moreover, if a sensor such as a fingerprint sensor is included instead of the imaging apparatus 1, the display devices 100 to 300 cover a detecting face of the fingerprint sensor in the covering state, and uncover the detecting face of the fingerprint sensor in the uncovering state. As can be seen, if the detecting face of the fingerprint sensor can switch between the covering state and the uncovering state in accordance with the folding transformation of the display unit 10, the fingerprint sensor can be disabled (OFF) in the covering state and enabled (ON) in the uncovering state.

The invention claimed is:

1. A display device, comprising: a display unit at least partially foldable and transformable, and including a display surface configured to display an image; a body unit provided at a back face of the display unit; a sensor having a detecting surface positioned to be covered with the display unit or the body unit; and a cover unit joined to the body unit, such that to cover the display unit and to at least render the display device dustproof, wherein the display device has a switchable state between a covering state in which the detecting surface is covered and an uncovering state in which the detecting surface is uncovered, the uncovering state being switched from the covering state by a folding transformation of the display unit, the body unit includes: a first casing including a first setting face on which the display unit is set, the first setting face being provided with the sensor; a second casing disposed adjacent to the first casing, and including a second setting face on which the display unit is set; a casing joining unit rotatably joining, about an axis, an end portion of the first casing and an end portion of the second casing; and a fastening unit fastening the second setting face and the display unit together, the covering state is set in an unfolded state in which the first casing and the second casing are arranged such that the first setting face and the second setting face form a horizontal surface, the uncovering state is set in a folded state in which the first casing and the second casing are folded with the casing joint unit such that the first setting face and the second setting face are oriented outward, the cover is foldable and transformable, the display device further comprises: a roller unit provided at an end portion of the first casing, across from a location at which the first casing and the second casing are joined, and rotatably configured to guide and fold the cover unit back to the back face of the display unit; and a transparent sealing member provided between the display unit and the cover unit and fastening the cover unit to the display unit, and in switching from the unfolded state to the folded state, the cover unit moves, together with the display unit, in a first direction away from the detecting surface, and as a result, a portion of the cover unit is folded back by the roller unit and moves from the back face to a front face of the display unit.

2. The display device according to claim 1, wherein the display unit is formed of a flexible transparent film or a flexible glass.

* * * * *